US012606426B2

(12) United States Patent
Hernandez

(10) Patent No.: US 12,606,426 B2
(45) Date of Patent: Apr. 21, 2026

(54) TRIPOD CAR JACK

(71) Applicant: Kelley Hernandez, Greenfield, CA (US)

(72) Inventor: Kelley Hernandez, Greenfield, CA (US)

( * ) Notice: Subject to any disclaimer, the term of this patent is extended or adjusted under 35 U.S.C. 154(b) by 345 days.

(21) Appl. No.: 18/430,897

(22) Filed: Feb. 2, 2024

(65) Prior Publication Data

US 2025/0250150 A1 Aug. 7, 2025

(51) Int. Cl.
*B66F 3/14* (2006.01)

(52) U.S. Cl.
CPC .................................. *B66F 3/14* (2013.01)

(58) Field of Classification Search
CPC ......... B66F 3/14; F16M 11/046; F16M 11/18; F16M 11/242
USPC ........................................................ 254/98
See application file for complete search history.

(56) References Cited

U.S. PATENT DOCUMENTS 3,314,655 A * 4/1967 Steele ........................ B66F 3/10 254/102
4,867,416 A * 9/1989 Garrett .................... F21V 21/22 254/2 R
5,975,496 A * 11/1999 Hong ........................ B66F 3/42 60/486

* cited by examiner

*Primary Examiner* — Seahee Hong
(74) *Attorney, Agent, or Firm* — Lyman Moulton, Esq.; Moulton Patents, PLLC

(57) ABSTRACT

Mechanical and hydraulic implementations of the car jack are the only product of their kind that utilize a ratchet mechanism that lifts the vehicle with a simple step on the lever, minimizing effort and time needed for a tire change. This unprecedented product is uniquely designed with a robust tripod structure that guarantees stability and support as the three legs provide a firm and secure base, eliminating the probability of wobbling or tilting during utilization. Moreover, the Step Jack weighs significantly less than traditional jacks, making it effortless to carry, while its folding ability allows for easy storage in a vehicle's trunk or glove compartment.

15 Claims, 8 Drawing Sheets

TRIPOD CAR JACK

BACKGROUND

Conventional car jacks can be time-consuming and cumbersome to use, leaving individuals vulnerable on the side of the road due to its heavy requirement of physical labor. Moreover, traditional car jacks can be heavy and difficult to move around, particularly for elderly individuals, or anyone dealing with a flat tire in adverse conditions. There have been no products available as original equipment or as an aftermarket to address this problem.

An apparatus that allows an individual to jack up a car with ease in a faster way that is not being met by any known device or system at present. There have been no products available as original equipment or as an aftermarket to address this problem either.

SUMMARY OF THE INVENTION

The main purpose of the tripod car jack is to provide users with a safer, faster, and more efficient way of lifting a vehicle during emergencies or when performing maintenance.

A mechanical embodiment of the tripod car jack includes a collar configured to pivotally extend three legs into a tripod and define a coaxial cavity and hole comprising a threaded inner wall. The tripod car jack also includes a ratchet wheel with teeth disposed in the coaxial cavity and attached to a lift rod received spirally through the hole via complementary threads. The tripod car jack additionally includes a pawl configured to engage with the ratchet wheel teeth via an arm extending through one of the three legs. The tripod car jack further includes a foot pedal joined to the one leg with the arm and configured to move down and up when respectively depressed and released via a return spring.

A hydraulic embodiment of the tripod car jack includes a hydraulic pawl disposed inside the coaxial cavity and configured to engage with the ratchet wheel teeth via a hydraulic fluid plumbed through one of the three legs. The foot pedal is joined to the one leg with the hydraulic plumbing configured to pump the hydraulic fluid when depressed and release pumping via the return spring. The hydraulic fluid is plumbed through the one of the three legs via a hydraulic tube between the foot pedal and the hydraulic pawl.

Figure 1:
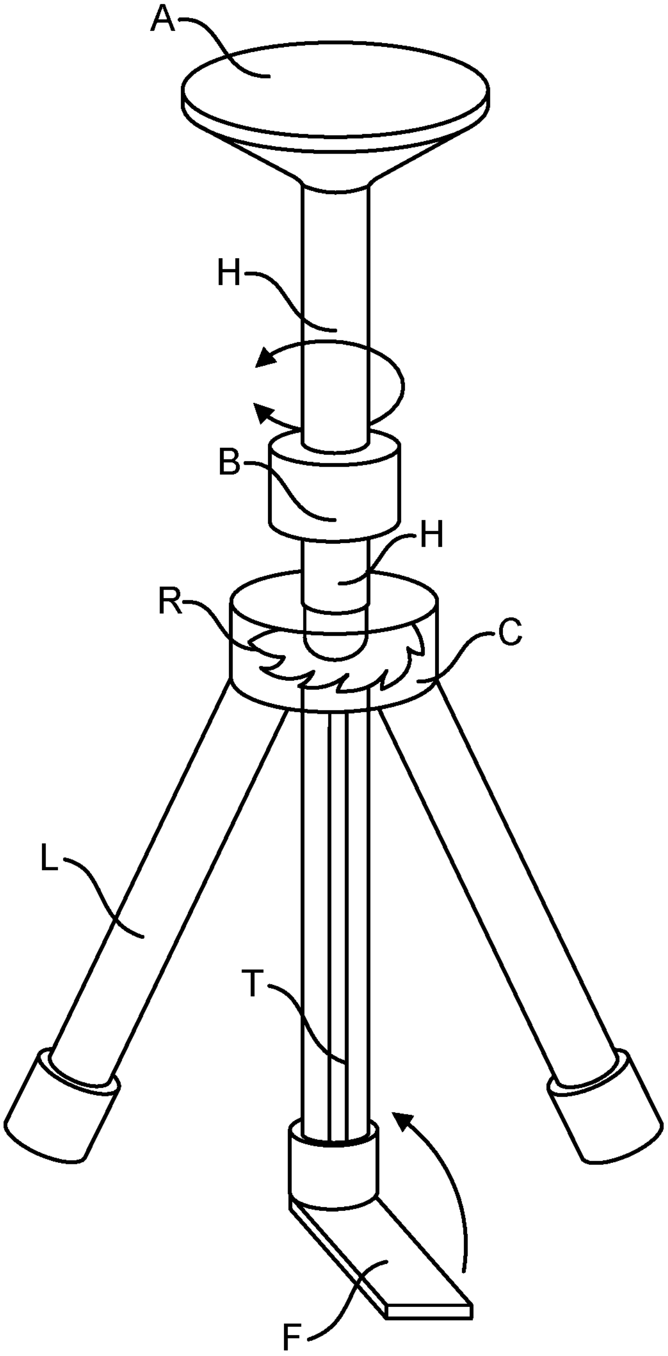
FIG. 1 is an extended perspective view of the tripod car jack with a locking sleeve in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is an extended perspective view of the tripod car jack with a locking sleeve showing: car jack platform referenced as A, locking sleeve referenced as B, collar C, lift rod H, ratchet wheel R, folding legs referenced as L, mechanical arm or hydraulic tube T, and extended foldable foot pedal referenced as F, in accordance with an embodiment of the present disclosure. The lift rod H engages with the collar C via complementary helical threads on the lift rod H and in the coaxial hole of the collar C in a twisting or a threading motion. The ratchet wheel R is depicted inside the collar C which is a hard metal so it would be practically hidden from view. The collar C is metallic in embodiments to support the large stress and strain imposed on it by the weight of a vehicle or car. Threads on the lift rod H are omitted for simplicity but the locking sleeve B engages with the lift rod H through complementary helical threads.

Figure 2:
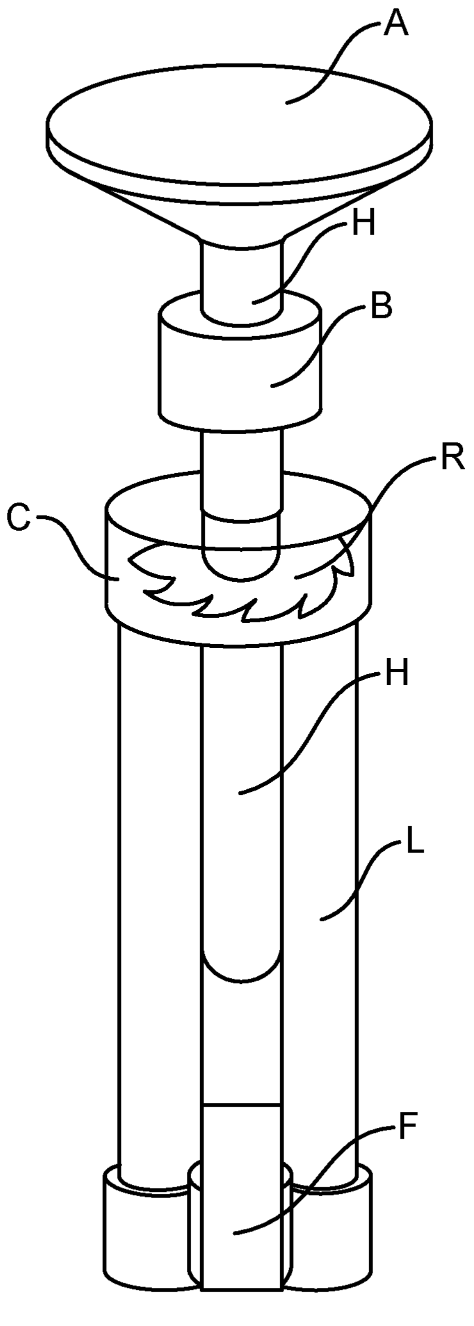
FIG. 2 is a collapsed perspective view of the tripod car jack with a locking sleeve in accordance with an embodiment of the present disclosure.

FIG. 2 is a collapsed perspective view of the tripod car jack with a locking sleeve showing: car jack platform referenced as A, locking sleeve referenced as B, folding legs referenced as L, extended foldable foot pedal referenced as F, ratchet wheel R with teeth, and lift rod H descended through the collar C in accordance with an embodiment of the present disclosure.

Figure 3:
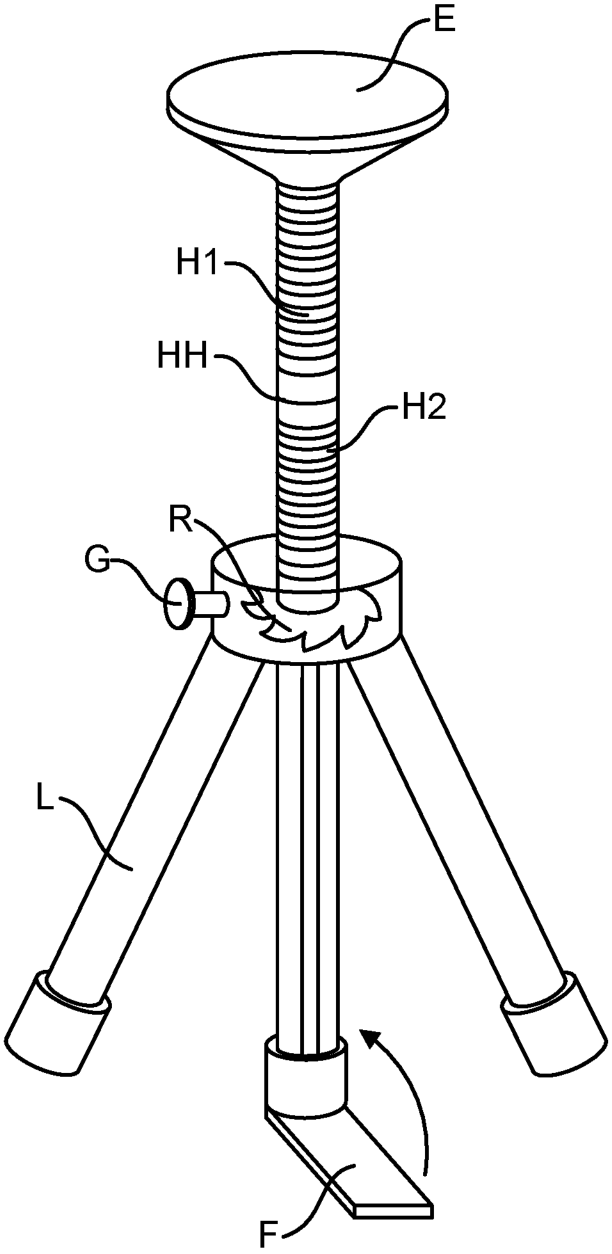
FIG. 3 is an extended perspective view of the tripod car jack with a locking pin in accordance with an embodiment of the present disclosure.

FIG. 3 is an extended perspective view of the tripod car jack with locking pin showing: folding legs referenced as L, extended foldable foot pedal referenced as F, hinged car jack platform referenced as E, locking pin G, ratchet wheel R, two part lift rod H1, H2 and transition threads HH in accordance with an embodiment of the present disclosure.

Figure 4:
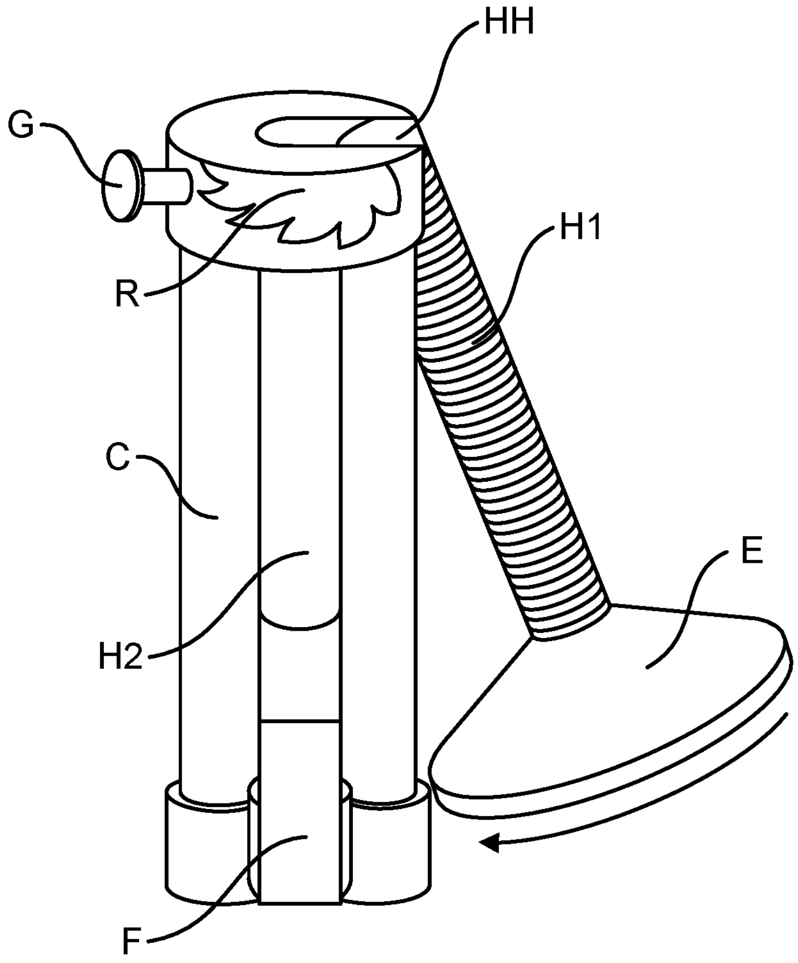
FIG. 4 is a collapsed perspective view of the tripod car jack with a two piece lift rod in accordance with an embodiment of the present disclosure.

FIG. 4 is a collapsed perspective view of the tripod car jack with a two piece lift rod showing: folding legs referenced as L, extended foldable foot pedal referenced as F, hinged car jack platform referenced as E, locking pin referenced as G, two piece lift rod H1, H2 and transition threads HH, ratchet wheel R in accordance with an embodiment of the present disclosure. Lower lift rod H2 is descended through the collar C hole and the upper lift rod H1 is separated therefrom at the transition threads HH. The platform E can also be screwed off the lift rod H1.

The present disclosed tripod car jack, also known as "Step Jack", offers a modern alternative design to the essential jack that guarantees users can change a tire more quickly, efficiently, and safely; thus, allowing for an improved operational experience Similar to a miniature tripod, the Step Jack introduces a novel car jack platform that employs a cutting-edge ratchet system that easily slides beneath the corner of a car or truck. With a simple step on the lever, the Step Jack's ratchet mechanism swiftly raises the centerpiece upward, lifting the vehicle with each extension. This handsfree operation ensures that the user's hands are never in harms' way, and that they can confidently handle the lifting process without worrying about accidents or injuries as they are bent over to manage the jack. In addition, the tripod structure is lightweight and compact permitting users to move the accessory with great ease. Designed for universal application the Step Jack can accommodate various vehicle sized, offering a secure and reliable lifting solution for every necessity, whether for domestic or professional services. This cutting-edge device not only ensures safety but also offers unparalleled versatility.

Figure 5:
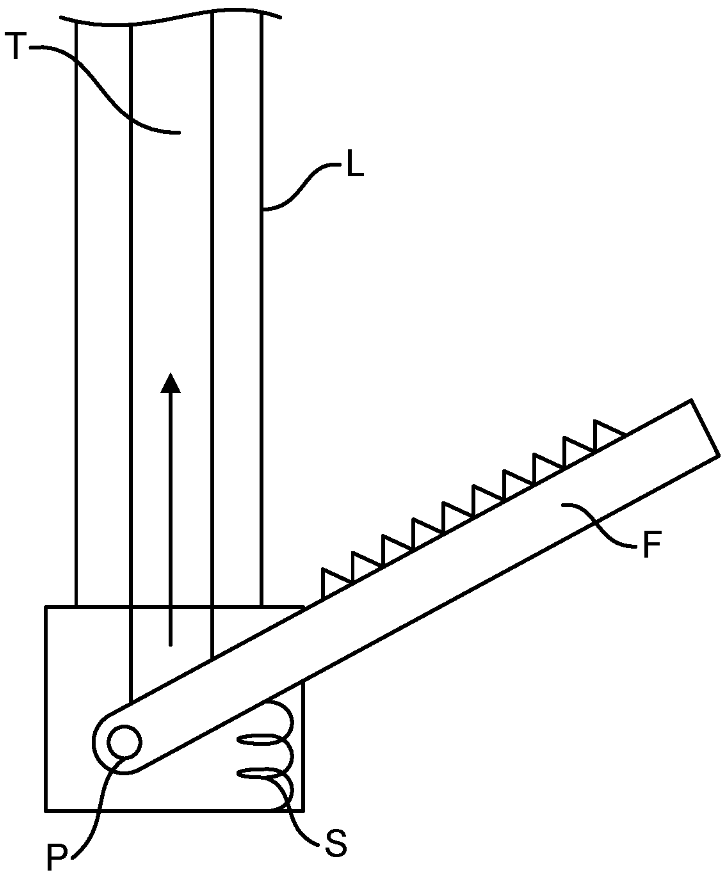
FIG. 5 is a cutaway view of the foot pedal and spring engagement with a mechanical arm and a hydraulic tube in accordance with embodiments of the present disclosure.

FIG. 5 is a cutaway view of the foot pedal and spring engagement with a mechanical arm and a hydraulic tube in accordance with embodiments of the present disclosure. The mechanical arm T is a hydraulic tube in an embodiment is situated inside one of the legs L and provides a respective mechanical and hydraulic link between the foot pedal F and the pawl X (not shown) as disclosed further below. The spring S provides a return of the foot pedal F to an upward position and provides a hyrdraulic release of pressure on the pawl X. A tread is shown on an upside of the foot pedal F for a traction in use. The pivot or pin P is a fulcrum and enables the foot pedal F to act as a lever arm.

Figure 6:
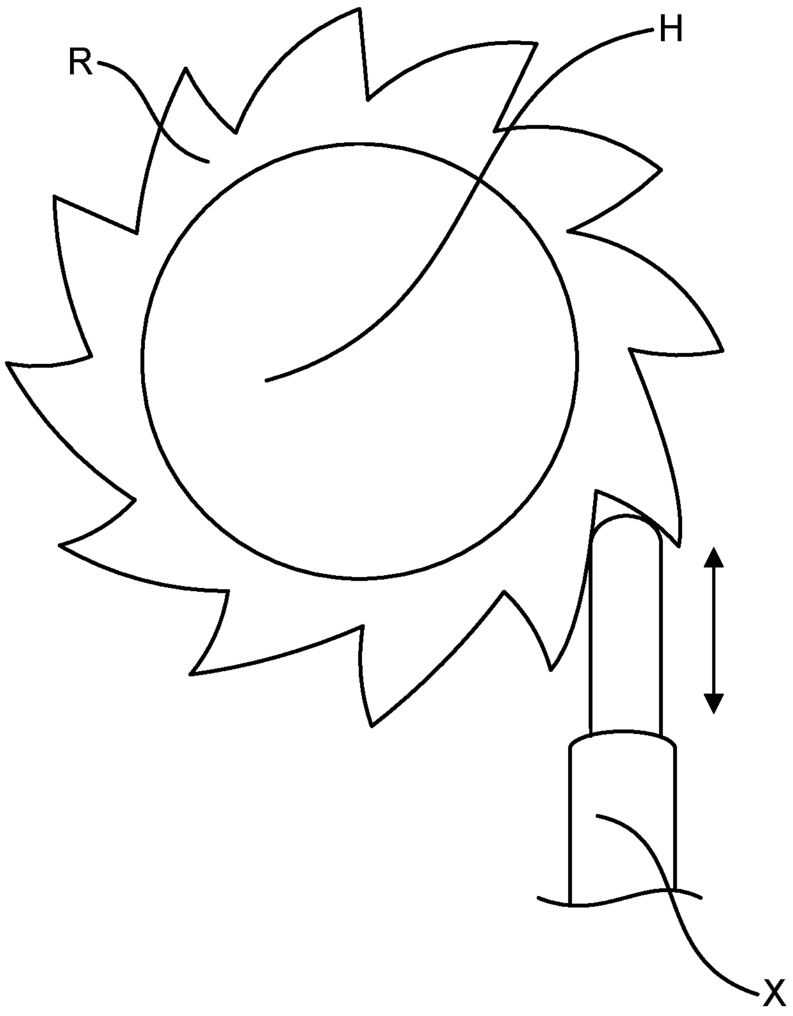
FIG. 6 is a detailed view of the ratchet wheel on the lift rod engaged with a mechanical and hydraulic pawl in accordance with embodiments of the present disclosure.

FIG. 6 is a detailed view of the ratchet wheel on the lift rod engaged with a mechanical and hydraulic pawl in accordance with embodiments of the present disclosure. The lift rod H runs through the ratchet wheel R and the teeth of the ratchet arm engage with the pawl X having a mechanical or a hydraulic linkage with the mechanical arm T which can also be a hydraulic tube. The ratchet wheel R enables a gain in turning the lift arm and raising it according to the helical thread there around to be incremental.

Figure 7:
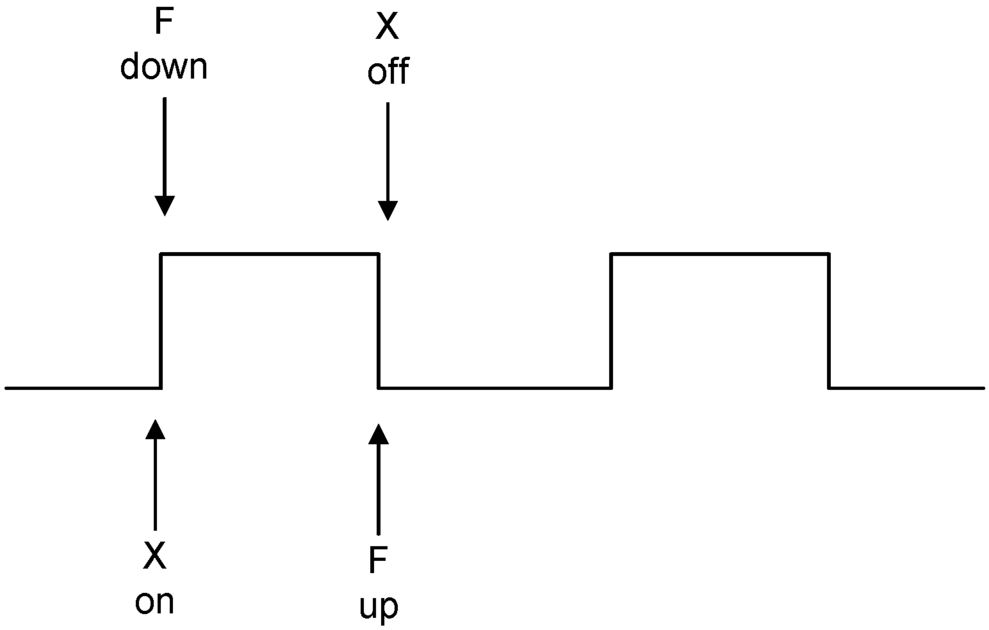
FIG. 7 is a timing diagram of the in accordance with an embodiment of the present disclosure.

FIG. 7 is a timing diagram of the in accordance with an embodiment of the present disclosure. A period of depressing the foot pedal F and return matches a period of the pawl X turning the ratchet wheel R by a single tooth. Represented by a square wave, the F dwn arrow starts the foot pedal depression or a hydraulic on pressure or a lift arm T engagement. The X off coincides with the foot pedal return to an upward position and a release of hydraulic pressure or a return of the mechanical arm T to a resting position so the pawl X is set for the next tooth engagement.

Figure 8:
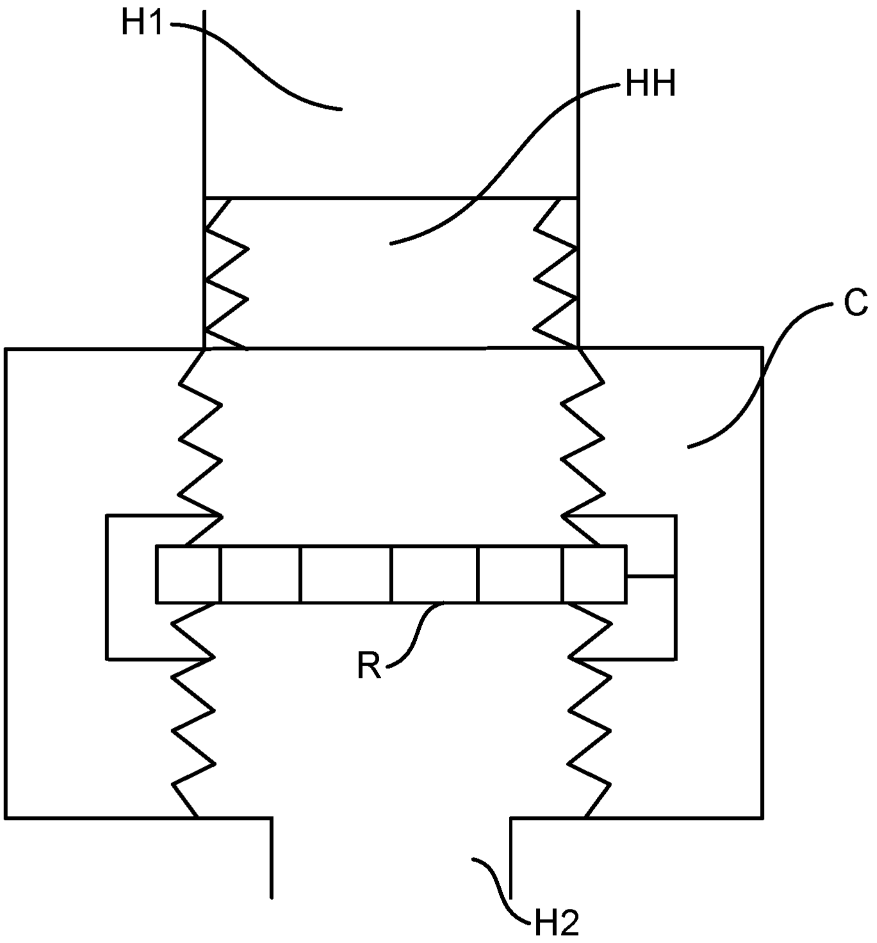
FIG. 8 is a cutaway view of the collar and the ratchet wheel and lift rod therein in accordance with an embodiment of the present disclosure.

FIG. 8 is a cutaway view of the collar and the ratchet wheel and lift rod therein in accordance with an embodiment of the present disclosure. The coaxial cavity of the collar C is shown housing the ratchet wheel R and shown receiving the lift arm H or in two parts H2 via helical complementary threads. The thread transition HH receives the upper lift arm H1 in a male-female relationship. The swinging or pivotal connection of the three legs into a tripod is omitted for sake of illustrative simplicity.

The strongest and most secure shape out of all the shapes is the triangle. The disclosure goes up and down like a camera tripod and up and down using a ratchet like a socket ratchet by just a simple pressure of your foot stepping down onto it. Make it go in reverse back down when you're done you pull it out you close it like a tripod small enough light enough it can fit in your glove compartment. Also light emitting diodes, aka LED lights on the inside for night time use for trucks even more simple you can put an extension bracket so the step jack can sit right on top just like the way the tripod is if it didn't have it each individual leg can tilt to the side and hold its position for when the car is at an angle. It comes with an attachment that you can connect to your cigarette lighter that has a tool at the other end so that one can go and unlock the bolts to remove the tire. Imagine your loved ones with a flat tire on the side of the road can't change it because it's too dark or it's raining or doesn't feel safe and secure because of time and the right tools. With the disclosure, also known as 'stepjack,' you get a flat tire and pop it out of the glove compartment and extend it out quickly like a tripod underneath your car. Step with one foot step and ratchet the car all the way up. Next, connect the extension cord to cigarette lighter with the modified tool at the end and loosen the bolts on your tire. After you replace your tire, tighten the bolts with your cigarette lighter tool wrench and use the Step Jack to bring the car back down and slide out the tripod and you are done. It closes quick, it's efficient fast and most of all safe.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A car jack comprising:

a collar configured to pivotally extend three legs into a tripod and define a coaxial cavity and a hole comprising a threaded inner wall;

a ratchet wheel with teeth disposed in the coaxial cavity and attached to a lift rod received spirally through the hole via complementary threads;

a pawl configured to engage with the ratchet wheel teeth via an arm extending through one of the three legs; and a foot pedal joined to the one leg with the arm and configured to move down and up when respectively depressed and released via a return spring.

2. The car jack of claim 1, wherein a period of depressing the foot pedal and return matches a period of the pawl turning the ratchet wheel by a single tooth.

3. The car jack of claim 1, wherein the legs of the tripod foldup into a compact parallel leg configuration.

4. The car jack of claim 1, wherein the lift rod recedes through the hole parallel with the three legs folded up in a compact configuration.

5. The car jack of claim 1, wherein the foot pedal folds up against the respective leg.

6. The car jack of claim 1, further comprising a locking sleeve to stop the lift rod from dropping through the collar.

7. The car jack of claim 1, further comprising a lock pin configured to radially thread through the collar and arrest the lift rod.

8. The car jack of claim 1, further comprising a car jack platform attached to the lift rod via helical threads.

9. The car jack of claim 1, further comprising a threaded female end of the lift rod configured to receive a threaded male extension lift rod.

10. The car jack of claim 9, wherein the threaded male extension lift rod is unthreaded and removed for a compact configuration.

11. The car jack of claim 1, wherein the pawl is hydraulic and is also received in the coaxial cavity in the collar.

12. The car jack of claim 1, wherein the pawl is hydraulic and configured to engage with the ratchet wheel teeth via a hydraulic fluid plumbed through one of the three legs.

13. The car jack of claim 12, wherein the foot pedal is joined to the one leg with the hydraulic plumbing configured to pump the hydraulic fluid when depressed and release pumping via the return spring.

14. The car jack of claim 12, wherein the hydraulic fluid is plumbed through the one of the three legs via a hydraulic tube between the foot pedal and the hydraulic pawl.

15. The car jack of claim 12, wherein the hydraulic pawl is fixed inside the coaxial cavity.

* * * * *